United States Patent Office 3,384,480
Patented May 21, 1968

3,384,480
OXIDATION RESISTANT BRAZING AND COATING MATERIALS AND METHOD OF MAKING THE SAME
Michael H. Snyderman, New York, N.Y., assignor to Curtiss-Wright Corporation, a corporation of Delaware
No Drawing. Filed Nov. 17, 1965, Ser. No. 508,372
8 Claims. (Cl. 75—175.5)

This invention relates to novel materials for brazing and for providing an oxidation resistant coating on a base metal, and more particularly to materials suitable for brazing tantalum, molybdenum, columbium, tungsten, zirconium, and other refractory metals; for brazing such refractory materials as graphite, zirconia, and alumina; and for providing a coating or sheathing resistant to oxidation at high temperatures on such metals and refractory materials and others.

The materials of the invention have the following composition in weight percent.

|  | Nominal | Range |
|---|---|---|
| Element, percent: |  |  |
| Titanium | 50 | 45–55 |
| Tantalum | 45 | 40–50 |
| Silicon | 5 | 3–8 |
| Others, maximum | 1 | 1 |

The nominal composition is preferred, but compositions falling within the indicated ranges perform satisfactorily. The components designated as "Others" are those elements normally associated as impurities with the three named elements, which it would be impractical to refine out without greatly increasing the cost. However, it is possible to produce the alloying elements to a purity of about 99.9% without unreasonable expense, so that ordinarily the impurities would not run higher than about 0.1%. In producing the brazing composition, metals of acceptable purity are used as the basis for proportions, and the actual percentage of impurity in the final material is not taken into account.

The brazing material may be produced in either solid alloy or powder form, depending on the intended use. The alloying elements are commonly supplied commercially as powders of various mesh sizes, to a specified purity. Accordingly, the solid alloy may be produced as follows.

Example I

Powdered titanium, tantalum, and silicon of a purity of at least 99%, and preferably 99.9% or better, are mixed in the selected proportions given above. The particle size is not critical, and may be whatever is convenient at low cost; normally such powders would be of −100 mesh or finer. The degree of mixing is likewise not critical, and may be done in any of various conventional blenders, or with a spatula in the crucible. The mixing need only be carried out so that there is a reasonable dispersion of the three components.

The crucible containing the mixed powders is heated in any suitable furnace under an inert atmosphere, such as argon or helium. The silicon melts first at about 2570° F., but owing to its small proportion this is not readily observable. At about 3000° F., the approximate melting temperature of the titanium, the whole mixture appears molten. Although the melting point of tantalum by itself is much higher, owing to its being completely immersed in the remainder of the melt it liquefies and goes into solution immediately. The temperature may be maintained between 3000° F. and 3500° F. for a period of 30 seconds to 10 minutes, long enough for homogenization of the melt to become complete. The lower temperatures require the longer periods, with the optimum being about 1 minute at about 3200° F. The melt is then furnace cooled under the inert atmosphere to room temperature.

The brazing and coating material may also be produced in powder form, in which form it is suitable either for brazing or for spraying an oxidation resistant surface coating on a base metal or refractory. The powder form is produced as follows.

Example II

Powdered titanium, tantalum, and silicon of a purity of at least 99%, and preferably 99.9% or better, are mixed in the selected proportions given above. Such powders should have a particle size between −200 and −325 mesh when intended for spray coating, and preferably of −325 mesh or finer when intended for use as brazing material. The powders are mixed in any of various conventional blending devices, and mixing should be carried on until the metals are thoroughly dispersed throughout the mix. The powdered material is then ready for use.

The solid alloyed material described in Example I has a remelt temperature of about 3200° F., and is suitable for conventional furnace brazing techniques under inert atmosphere. It is also used to provide an oxidation resistant surface coating by a dip-coating procedure. The article to be dip-coated, having a clean surface, is heated in the same furnace with the alloy, and when the alloy is completely melted the article is immersed therein. A very short immersion, of the order of one minute, is sufficient to provide a tightly adherent coating.

The powdered material described in Example II may be used for furnace brazing under inert atmosphere by conventional techniques. It is also suitable for use in one of the various well-known guns for spraying powdered metal through a high-temperature plasma arc onto an article to provide an oxidation resistant coating; the gun should provide a flow of inert gas to maintain a protective atmosphere at the point of impact.

Either the solid or the powdered material provides good brazed joints of any metals able to withstand the brazing temperature. Tantalum, columbium, molybdenum, and tungsten, which are particularly difficult to braze by prior art materials, have been successfully brazed with the materials of the present invention. Also, such refractories as graphite, zirconia, and alumina may be brazed to each other or to metals.

Brazed joints made with the materials of the invention show tensile strengths of approximately 27,000 p.s.i. at room temperature, and about 12,000 p.s.i. at 2400° F.

Both the solid alloy dip-coated onto specimens and the powdered material spray-coated onto specimens are particularly useful as oxidation resistant coatings at high temperatures. Specimens were exposed to air for 32 hours at a temperature of 2400° F. and were evaluated against other coatings proposed for the purpose and given the same treatment. The materials of the invention showed a weight gain in oxide products of only 30 milligrams per square centimeter of area, whereas the nearest competitor coating showed a weight gain of 85 milligrams, and one of the comparison coatings showed a gain as high as 313 milligrams. The rate of weight gain on the materials of the invention, from 1 to 32 hours at 2400° F., followed a logarithmic function, and the oxide formed was dense, adherent, and protective, so that continued exposure to high temperatures in use would not greatly further affect the materials. Even where the slight visible oxide scale was removed, no further scale growth was observed. Metallographic examination showed negligible penetration of the oxide into the base metal.

Although the invention has been described above in a preferred embodiment, various minor modifications may

What is claimed is:

1. A brazing and coating material consisting essentially of the following elements by weight: titanium 45–55%, tantalum 40–50%, silicon 3–8%.

2. The brazing and coating material recited in claim 1, wherein said titanium, tantalum, and silicon are alloyed.

3. The brazing and coating material recited in claim 1, wherein said titanium, tantalum, and silicon are powders having a particle size finer than −200 mesh.

4. The brazing and coating material recited in claim 1, wherein said titanium is approximately 50%, said tantalum is approximately 45%, and said silicon is approximately 5%.

5. The brazing and coating material recited in claim 4, wherein said titanium, tantalum, and silicon are alloyed.

6. The brazing and coating material recited in claim 4, wherein said titanium, tantalum, and silicon are powders having a particle size finer than −200 mesh.

7. A method of making a brazing and coating material, comprising mixing powdered metals in the following proportions: titanium 45–55%, tantalum 40–50%, silicon 3–8%; heating said mixed powdered metals in an inert atmosphere to at least the melting temperature of said titanium; holding said metals at high temperature until said metals are alloyed; and cooling said alloy in said inert atmosphere.

8. The method of making a brazing and coating material recited in claim 7, wherein said titanium is approximately 50%, said tantalum is approximately 45%, and said silicon is approximately 5%; said temperature is between 3000° F. and 3500° F.; and said metals are held at said temperature for a period of 30 seconds to 10 minutes.

References Cited

UNITED STATES PATENTS

| | | | |
|---|---|---|---|
| 3,249,429 | 5/1966 | Armantrout et al. | 75—174 |
| 3,259,971 | 7/1966 | Gagola et al. | 75—175.5 |
| 3,293,741 | 12/1966 | Gilliland | 75—174 |
| 3,309,767 | 3/1967 | Sama et al. | 75—175.5 |

HYLAND BIZOT, *Primary Examiner.*

RICHARD O. DEAN, *Examiner.*